Sept. 10, 1963      E. C. EHLKE      3,103,107
MOTOR CURRENT LIMITING APPARATUS
Filed May 20, 1963
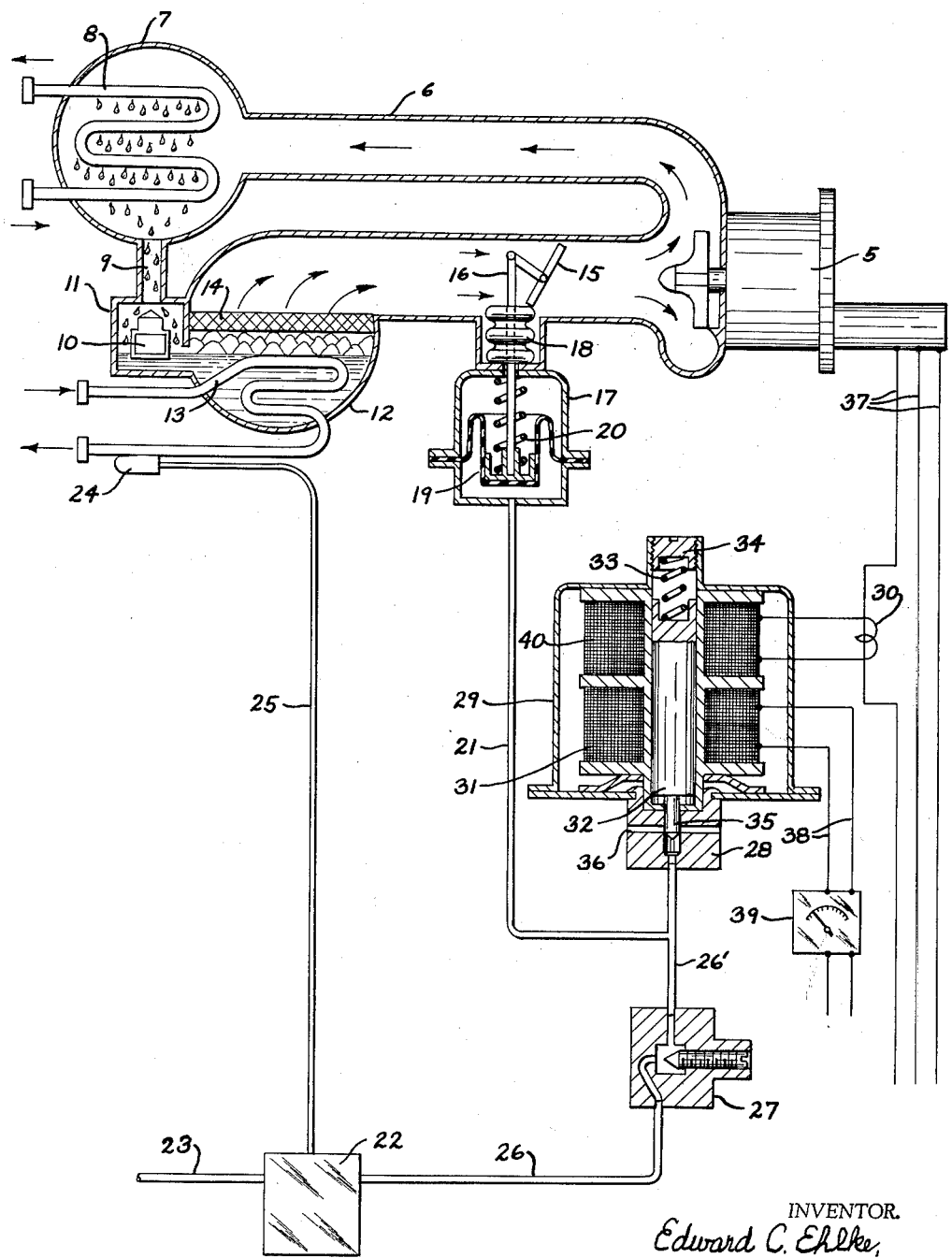
INVENTOR.
Edward C. Ehlke,
BY Morsell & Morsell
Attys.

United States Patent Office
3,103,107
Patented Sept. 10, 1963

3,103,107
MOTOR CURRENT LIMITING APPARATUS
Edward C. Ehlke, Brookfield, Wis., assignor to Johnson Service Company, Milwaukee, Wis., a corporation of Wisconsin
Filed May 20, 1963, Ser. No. 282,835
3 Claims. (Cl. 62—209)

This invention relates to improvements in motor current limiting apparatus, and more particularly to an apparatus associated with any type of electric motor driven mechanism that is susceptible of pneumatic control of the work load imposed on the electric motor.

A primary object of the invention is to provide a motor current limiting apparatus incorporating means for operating an associated electric motor driven mechanism in correspondence with the work load imposed on the electric motor to prevent an excessive damaging current load on the latter.

A more specific object of the invention is to provide a motor current limiting apparatus for association with an electric motor driven mechanism whereby the motor current is automatically prevented from exceeding a pre-selected maximum by means which include a load limiting solenoid value which regulates the operation of a pneumatic motor which in turn operates a fluid control damper.

A further more specific object of the invention is to provide, in association with a pneumatically controlled electric motor driven mechanism having a fluid control damper, electrically responsive "floating control" means for regulating the movements of the damper.

A further object of the invention is to provide a motor current limiting apparatus, including a solenoid valve wherein the latter is constructed so as to eliminate objectionable noise and valve vibration, and which eliminates erratic air flow control.

A further object of the invention is to provide a motor current limiting apparatus which incorporates a minimum of moving parts, which is simple and economical to manufacture, which is very reliable in operation, and which is well adapted for the purposes described.

With the above and other objects in view, the invention consists of the improved motor current limiting apparatus, and its parts and combinations as set forth in the claims, and all equivalents thereof.

In the accompanying drawing the view is a semi-diagrammatic showing of the improved motor current limiting apparatus with components thereof shown in section.

Merely for the purpose of illustration, the motor current limiting apparatus has been shown in association with an alternating current motor driven refrigeration apparatus, but it should be understood that the invention is susceptible of broader application and may be applied to various forms of electric motor driven mechanisms which are susceptible of pneumatic control of the work load imposed on the motor.

In the illustrated embodiment, the numeral 5 designates an electric motor which operates a conventional compressor 6. The refrigerating gas within the chambers or ducts of the compressor 6 is directed into a condenser 7 of the type wherein cooling water flows through a coiled tube 8. The coiled portion of the water-carrying tube 8 is housed within the condenser 7 and the refrigerating medium, after being condensed, returns from the condenser chamber through a restriction 9 controlled by a float valve 10 within the float valve chamber 11, to an evaporator 12 which houses some of the refrigerant liquid, the remainder of the latter being in the condenser 7 and duct 9. Within the evaporator 12 there are tubes 13 through which circulates a secondary refrigerant liquid, such as cooled water. The liquid refrigerant in the evaporator 12 removes heat from the secondary refrigerant circulating through the tubes 13 and forms a gas which passes through a liquid eliminator 14 into the suction duct of the compressor 6 from whence it passes into the condenser chamber and is there condensed into liquid which returns to the evaporator chamber 12 via the float valve controlled restriction 9, as previously mentioned.

The objective of the present invention is to provide a "floating control" for the electric motor 5, dependent upon the load thereon, so that the motor current will not exceed a pre-selected maximum. In the present embodiment there is a movable damper 15 within the suction duct of the compressor 6, which damper is mounted on and operated by a rod 16, the manipulation of which will be referred to hereinafter. However, it should be observed that when the damper 15 is moved toward closed position within the suction duct of the compressor 6 there will be less refrigerant flowing through the compressor to be pumped thereby, with the result that the torque imposed on the motor 5 is reduced and, consequently, the motor requires less current.

It will thus be evident that the rate of flow of gaseous refrigerant through the suction duct of the compressor 6 is a factor in determining the power required of the compressor and consequently the current requirement of the motor. Thus the current drawn by the motor 5 is dependent in the present embodiment on the position of the damper 15.

As was previously noted, the damper 15 is operated by the rod 16 and the rod 16 is reciprocated by a pneumatic motor 17 depended from a lower wall portion of the suction duct of the compressor, the rod 16 carrying a bellows 18 which provides a seal as between the rod 16 and the suction conduit of the compressor. The pneumatic motor 17 is of conventional construction, having a diaphragm 19 which flexes inwardly against a confined coil spring 20, whereby pressures acting against the diaphragm of the pneumatic motor result in axial movements of the damper operating rod 16. An air tube 21, forming a conduit or piping having restriction, which will be referred to more fully hereinafter, introduces air under pressure in a restricted manner into the pneumatic motor so as to react against the motor diaphragm 19.

The improved motor current limiting apparatus also includes a pneumatic thermostat 22, into which air from a source is introduced through a pipe 23. For the pneumatic thermostat there is a temperature responsive element or bulb 24 which is thermally responsive to the temperature of the cooling liquid in the tube 13 of the evaporator. A tube 25 connects the bulb or temperature responsive element 24 with the thermostat 22. Air discharged by the pneumatic thermostat 22 through a pipe 26 has a pressure directly related to the temperature of the cooling liquid which flows through the discharge end of the coil 13. The tube 26 through its extension 26' connects with the air tube 21 leading to the pneumatic motor. However, between the tube 26 and its extension 26' there is an air flow restrictor 27, and it should be further noted that the tube extension 26' is in communication with the air discharge boss portion 28 of a motor current limiting solenoid valve 29. When, in the present embodiment, the refrigeration load is greater than can be accepted by the compressor 6 without causing the motor current to exceed a pre-selected maximum, the current from a transformer 30 energizes the solenoid coil 40 of the solenoid valve 29 sufficiently so that the electromagnetic pull on the solenoid plunger 32 is just sufficient to overcome the force of gravity on the moving parts and that of a spring 33 which is adjustable by means of a set screw 34, whereby the valve 35 is moved to open position with respect to the air discharge duct 36 in the solenoid boss 28, thus permitting some of the control air to escape to the atmosphere. Hence, the pressure of the control air in the pipe 21, forming a conduit having restriction, branching off of the tube extension 26' and leading to the pneumatic motor, is reduced. The air flow restrictor 27 in the air control line, permits the solenoid valve to reduce the control pressure by exhausting only a small quantity of air. When the pressure of the control air in the pipe 21 is thus reduced, the pneumatic motor will cause the damper 15 to move toward its closed position. When this condition attains the compressor, of course, is caused to pump less refrigerant, whereby the torque imposed on the motor 5 is reduced, and the motor, consequently, requires less current fed to it through the electric motor power supply lines 37.

Attention should also be directed to the fact that certain current carrying lines 38 to the solenoid coil 31 which extend to a source of power, such as utility lines or a battery, are intersected by a manually adjustable electric power supply switch 39. The latter is adjustable for determining the magnitude at which the motor current will be limited. With the energizing of the solenoid winding 31 being thus manually adjusted at the power supply, means are thereby provided for electrically adjusting the solenoid valve so it will act at a desired level of current in the other winding 40 of the solenoid valve.

When there is a reduction of the control air pressure to the pneumatic motor 17, which results in a closing movement of the damper 15 and the motor load is reduced so that the motor requires less current, the transformer output current to the solenoid 29 is reduced and the original opening of the solenoid valve 35 is thereby reduced. A continuous repetition of the described sequence of actions constitutes a "floating control" to maintain the maximum current for the electric motor 5 near the value that was pre-selected by the initial setting of the adjusting screw 34 for the solenoid spring 33. The solenoid valve 35 moves or "floats" between its open and closed positions and does not, in fact, function in intermediate positions. This results, therefore, in an arrangement whereby the apparatus, during overload conditions, permits the current values for the electric motor to float between the high and low values of the differential.

With further reference to the motor current limiting solenoid valve 29 it should be stated that the diameter of the valve port or orifice and the controlling valve plunger 35 should be relatively small. Thus, the effect of the pressure on the valve plunger (acting in the direction of the valve opening) is reduced to a sufficiently low value to permit the modest electromagnetic forces of the solenoid to substantially govern the degree of valve opening. The moving parts of the solenoid valve may travel beyond the closing position, in the closing direction of movement of the valve plunger, in order to prevent vibration of the valve plunger against its seat, which might result from the normal effect of the alternating current solenoid action. Consequently, in the present solenoid valve, rattle of the valve plunger against the valve seat and consequent objectionable noise and valve vibration is eliminated, thereby preventing erratic fluid flow control.

The characteristics of the improved apparatus may best be defined by the equation $$y = kx(1 - e^{-t/RC})$$

$y$ in the equation represents the control element position which in the present embodiment is the damper 15, the operation of which has previously been dealt with. $k$ in the equation represents a characteristic of the solenoid means, and the pneumatic motor 17, and this characteristic is determined by the condition of the spring 33, the coil 40, and the solenoid plunger 32 and the spring 20. $x$ in the above stated equation, which represents the current drawn by the electric motor, results from the output from the transformer 30. $t$ in the equation represents time, and R in the equation represents the pneumatic resistance which is influenced by the air flow restrictor 27 and the fact that the pipe or conduit 21 has a restriction therein. C in the equation represents pneumatic capacitance, and in the embodiment illustrated it may comprehend the pneumatic motor 17 and the air tube 21. As to the portion of the equation which includes "$1-e$," the value of "$e$" is a well known mathematical expression or Naperian modulus, which is 2.7183. It will thus be evident that in the above quoted equation RC and $k$ are all predetermined.

As an example, the solenoid 29 can be so designed that the valve 35 moves 0.01 inch per ampere, which in turn permits a readjustment of pressure to develop in the pneumatic motor 17 which can be related, through spring 20, to a movement of the rod 16 of 2740 inches per inch of movement of the valve 35. In other words, a mechanical advantage of 2740 is realized in that a movement of 0.0021 inch of valve 35 gives a movement of 5.75 inches on rod 16. One practical pneumatic circuit is realized when the product of $R \times C = 12.1$ seconds, which is obtained when $R = 12.38$ lb.$_f$ sec./in.$^5$ and $C = 0.978$ in.$^5$/lb.$_f$.

This application is a continuation-in-part of my prior application, Serial No. 192,549, for Motor Current Limiting Apparatus, filed May 4, 1962, now abandoned, and assigned to the assignee of this application.

The improved motor current limiting apparatus which is susceptible of use with various types of electric motor driven mechanisms having pneumatic control of the work load imposed on the electric motor, efficiently controls the motor current about a pre-selected maximum during periods when the regular control (the thermostat 22) would have caused an excessive work load on the compressor 6. The apparatus is simple and economical to manufacture and install, is reliable in operation, and is well adapted for the purposes set forth.

What I claim is:

1. In combination, an enclosure housing a medium, a tube within the enclosure containing a cooling fluid, an electric motor, means associated with the motor on which the medium in the enclosure imposes a work load, a movable member within the enclosure for regulating the load which the housed medium imposes on the electric motor associated means, a pneumatic motor for operating said movable member, a fluid thermostat responsive to the temperature of the cooling fluid within said tube, control fluid piping forming under all magnitudes of electric motor current direct and continuous fluid communication between the fluid thermostat and said pneumatic motor to transmit fluid under pressure continuously to the latter, said control fluid piping including fluid restricting means, solenoid valve means shunted off of said piping and having a fluid discharge orifice and an electrically operated valve plunger controlling the orifice, and means responsive to the magnitude of the electrical current drawn by said electric motor for positioning the solenoid valve plunger between open and closed positions relative to the fluid discharge orifice to vary the pressure of the fluid transmitted to the pneumatic motor through the piping between the thermostat and pneumatic motor when the electrical current drawn by the electric motor exceeds a predetermined value.

2. In combination, an enclosure housing a medium, a tube within the enclosure containing a cooling fluid, an electric motor, means associated with the motor on which the medium in the enclosure imposes a work load, a movable member within the enclosure for regulating the load which the housed medium imposes on the electric motor associated means, a pneumatic motor for operating said movable member, a fluid thermostat responsive to the temperature of said cooling fluid within said tube, control fluid piping forming under all magnitudes of electric motor current direct and continuous fluid communication between the fluid thermostat and said pneumatic motor to transmit fluid under pressure to the latter, said control fluid piping including fluid restricting means, solenoid valve means shunted off of said piping and having a fluid discharge orifice and an electrically operated valve plunger controlling the orifice, and means responsive to the magnitude of the electrical current drawn by said electric motor for positioning the solenoid valve plunger between open and closed positions relative to the fluid discharge orifice to vary the pressure of the fluid transmitted to the pneumatic motor through the piping between the thermostat and pneumatic motor when the electrical current drawn by the electric motor exceeds a predetermined value, said control fluid piping having means associated therewith which include a single exhaust port to exhaust control fluid to the atmosphere and which exhausts control fluid from the pneumatic motor chamber to the atmosphere when the electric motor is at overload.

3. The combination of claim 1 wherein the pneumatic motor moves said movable member at a predetermined rate of change of position in accordance with the characteristics represented by the equation $$y = kx(1 - e^{-t/RC})$$

in which $y$ represents the movable member position; $k$ represents a characteristic of the solenoid valve and the pneumatic motor; $x$ represents the current drawn by the electric motor; $t$ represents time; $R$ represents pneumatic resistance; and $C$ represents pneumatic capacitance.

References Cited in the file of this patent

UNITED STATES PATENTS

| | | |
|---|---|---|
| 2,817,213 | Miner | Dec. 24, 1957 |
| 2,955,436 | Miner | Oct. 11, 1960 |